United States Patent

[11] 3,585,487

[72] Inventor John L. McNally
New York, N.Y.
[21] Appl. No. 836,885
[22] Filed June 26, 1969
[45] Patented June 15, 1971
[73] Assignee Burroughs Corporation
Detroit, Mich.

[54] HIGH-SPEED PRECISION RECTIFIER
9 Claims, 6 Drawing Figs.

[52] U.S. Cl. .......... 321/8, 307/235, 307/242, 321/47
[51] Int. Cl. .......... H02m 7/12
[50] Field of Search .......... 307/235, 242; 321/8, 47; 324/119

[56] References Cited
UNITED STATES PATENTS 3,411,066 11/1968 Bravenec .......... 321/8
3,502,905 3/1970 Bicking .......... 307/235
3,509,372 4/1970 Bicking .......... 307/236

*Primary Examiner*—William M. Shoop, Jr.
*Attorney*—Charles S. Hall

ABSTRACT: This invention relates to a high-speed, full-wave rectifier having two parallel forward paths, one for transmitting positive input signals and the other for inverting and transmitting negative input signals to a common output. Each path includes a gate for passing signals in response to a command. A comparator which generates a first voltage in response to a positive input and a second voltage in response to a negative input cooperates with the gates to enable the gate in the first forward path when the input is positive and to enable the gate in the second forward path when the input is negative. Thus, positive signals are passed through the first forward path to the output and negative signals are inverted and passed through the second forward path to the output thereby converting an arbitrary input waveform to full-wave, rectified output waveform.

INVENTOR.
JOHN L. McNALLY
BY Charles R. Donohoe
AGENT

INVENTOR
JOHN L. McNALLY
BY Charles R. Donohoe
AGENT

INVENTOR.
JOHN L. McNALLY

BY Charles R. Donohoe

AGENT

HIGH-SPEED PRECISION RECTIFIER

BACKGROUND OF THE INVENTION

This invention relates to a full-wave rectifier capable of rectifying voltages over a wide frequency spectrum without the need for feedback circuits or high gain amplifiers. The rectifier is particularly suitable for rectifying small signals in the neighborhood of 0 volts.

It is often necessary to derive a full-wave rectified signal from arbitrary input signals. Heretofore, such circuits customarily utilized diodes or crystals as a means of conversion. When small signals are rectified by diodes, the nonlinear knee portion of the diode E/I curve causes distortion of the rectified signal. Other circuit arrangements such as diodes used with operational amplifiers correct these nonlinearities but do not have a wide frequency response. Multiple forward path rectifiers have always required a feedback loop for operation. The inherent characteristics of a feedback path, such as low frequency response, phase distortion and a need for high amplification, have always placed a limit on the usefulness of these circuits. Thus, multiple forward path rectifiers have been less than adequate for low-signal rectification and for high frequency response.

It is, therefore, an object of this invention to provide an improved high-speed rectifier for rectifying low-amplitude signals over a wide-frequency spectrum.

It is also an object of this invention to provide a high-speed rectifier for low amplitude-input signals without using a feedback loop.

It is still a further object of this invention to provide a high-speed rectifier for rectifying an arbitrary input signal about a variable, predetermined, reference voltage.

In carrying out the objects of the invention applicant has invented a full-wave rectifier having two forward paths from input to output with a phase inverter in one path and a gating element in each path. A control means enables conduction through one of the paths when an input signal is positive with respect to a given reference and enables conduction through the other path when the input is negative with respect to the reference. Consequently, a signal having a first polarity with respect to the reference is passed without rectification from input to output through one of the paths, and a signal having an opposite polarity is inverted and passed from input to output through the other path, again without rectification. The composite at the output of the signals from each forward path has only one polarity with respect to the reference, and therefore, a full-wave rectification of the input is generated.

The invention is further explained in relation to the following drawings in which.

DESCRIPTION OF THE PREFERRED EMBODIMENT

Figures 1, 1A, 2:
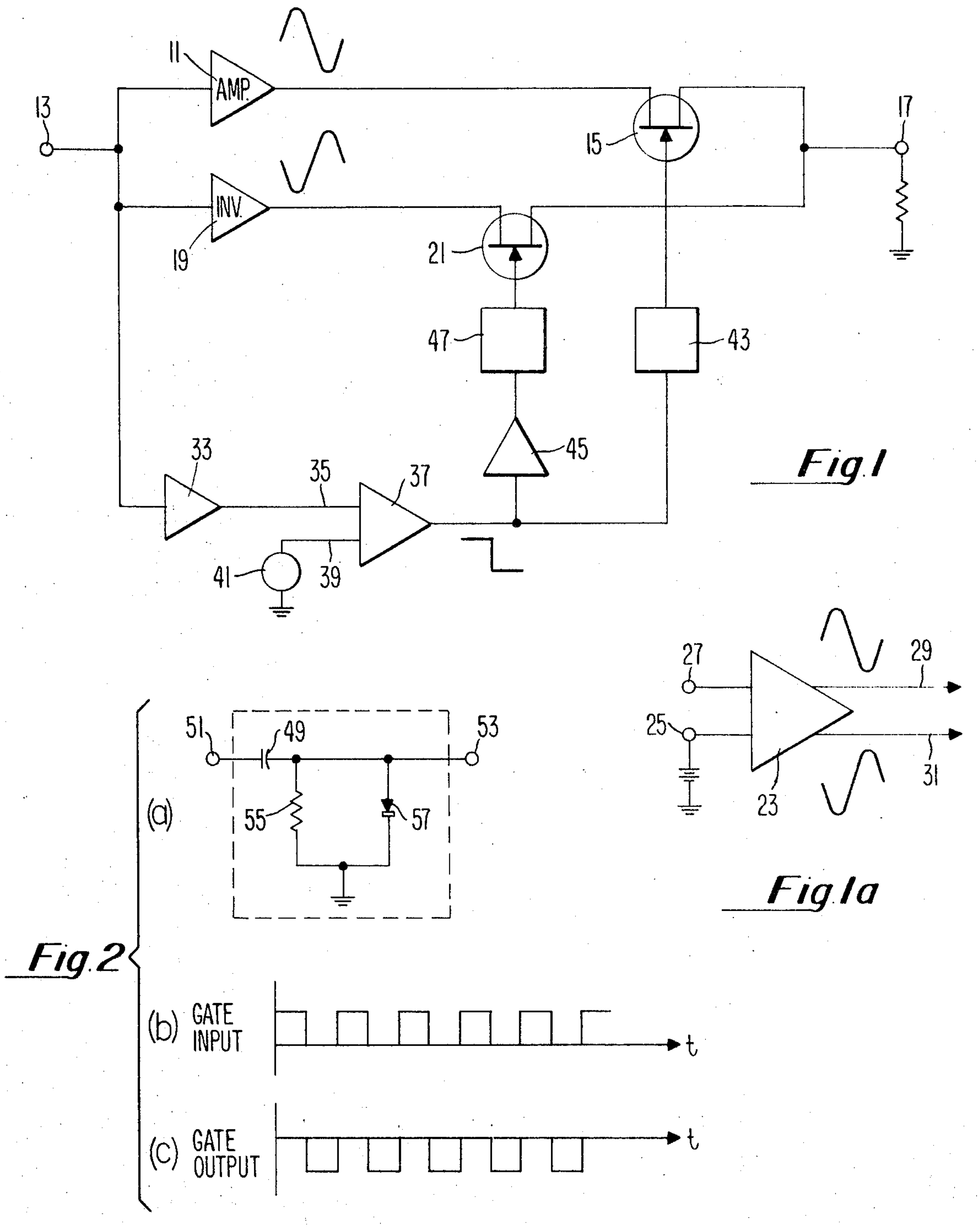
FIG. 1 is a block diagram of the preferred embodiment of applicant's rectifier.
FIG. 2 is a schematic diagram of a gate driver circuit, showing typical input and output waveforms.

As shown in FIG. 1, in applicant's full-wave rectifier, a conventional amplifier 11 is connected to input 13 for receiving and amplifying arbitrary input signals. A field-effect transistor 15, hereinafter designated as FET, is connected between the output of amplifier 11 and the output terminal 17 of the rectifier and is used as a gating element. Amplifier 11 and FET 15 constitute a first forward path between the input and output for passage of positive signals when FET 15 is enabled. A phase inverter 19 having the same gain factor as amplifier 11 is also connected to the rectifier input 13. A FET 21, used as gating element, is connected between the output of inverter 19 and the rectifier output terminal 17 to constitute a second forward path between input and output for inverting and conducting negative input signals when FET 21 is enabled.

Amplifier 11 is not required if the gain factor of inverter 19 is unity. However, amplifier 11 and inverter 19 perform other ancillary functions such as presenting a high impedance at the input of the rectifier and providing amplification for small signal inputs. As shown in FIG. 1*a*, amplifier 11 and inverter 19 may conveniently be replaced by a differential amplifier 23 having terminal 25 maintained at a constant bias potential and terminal 27 connected to rectifier input 13. The in-phase output 29 is connected to FET 15, and the inverted output 31 is connected to FET 21.

An amplifier 33 is connected to input 13 for amplifying and feeding the input signal to input terminal 35 of a comparator 37. The other comparator input 39 is connected to a reference source 41 which establishes a reference about which rectification takes place. For rectification about a 0-volt potential, the output of source 41 is maintained at ground potential. However, the value of the voltage from reference source 41 may vary in either the positive or negative sense if desired and may also vary with time such as in a linear sweep or square wave.

Comparator 37 may be an overdriven amplifier, a Schmitt trigger, or any other circuit capable of generating a step output when the input at terminal 35 goes above the reference level at terminal 39. In the preferred embodiment, comparator 37 generates at 10-volt output when the rectifier input is more positive than the reference voltage and a 0-volt output when the input is more negative than the reference. In order to adapt the output of comparator 37 to control FET's 15 and 21, the comparator output is connected to a gate driver 43 and to a logical inverter 45. Gate driver 43 which adapts the comparator output for driving FET 15 is connected to the control terminal thereof. The output of logical inverter 45 is fed to a gate driver 47 which is identical to gate driver 43. The output of gate driver 47 is connected to the control terminal of FET 21.

The gate drivers are basically DC level shifters, that is, for example, when the input to one of the gate drivers is 10 volts, the output is 0 volts, and when the input is 0 volts, the output is −10 volts. Thus the gate drivers may be any suitable level shifter.

Shown in FIG. 2*a* is an example of a gate driver circuit, which may be used in applicant's rectifier. A capacitor 49 is connected serially between gate driver input terminal 51 and output terminal 53. A resistor 55 and diode 57 are connected in parallel between output terminal 53 and ground. Diode 57 is oriented with its anode connected to terminal 53 and its cathode connected to ground. In operation, when a positive 10-volt signal appears at input terminal 51, capacitor 49 charges through the parallel combination of resistor 55 and diode 57. Since the forward resistance of diode 57 is much smaller than that of resistor 55, the charging current flows through the diode. Because the forward resistance of diode 57 is very small, the output voltage at terminal 53 is approximately zero. When the input voltage at terminal 51 goes to zero, capacitor 49 discharges. Since the back resistance of diode 57 is much greater than the resistance of resistor 55, the discharge current will flow through resistor 55. Therefore, the voltage at output terminal 53 will be the voltage impressed across resistor 55 due to the discharge current which voltage is −10 volts. Shown in FIG. 2*b* is a typical, input waveform that terminal 51 would receive from comparator 37. Shown in FIG. 2*c* is the resulting output voltage at terminal 53. It can be seen that the input voltage has shifted by −10 volts.

Logical inverter 45 converts a 10-volt input to a 0-volt output and, reciprocally, converts a 0-volt input to a 10-volt output. An example of a suitable inverter well known in the art is a bistable multivibrator circuit triggered by the comparator output. Such a circuit is shown in the General Electric Transistor Manual, 6th edition, FIG. 11.8, on page 168.

Logical inverter 45 and gate driver 47 may be combined into a single unit by using an operational amplifier having an input connected to comparator 37 and an output connected to the control terminal of FET 21. Thus, when comparator 37 generates a 10-volt output, the inverted output voltage from the operational amplifier will be −10 volts. When the comparator output is 0 volts, the input to the operational amplifier will be 0 volts, and therefore the output voltage delivered to FET 21 will be 0 volts. Thus, it can be seen that an operational amplifier generates the same voltages as the logical inverter and gate driver combined and therefore is a suitable adaption means for enabling FET 21 when comparator 37 emits a 0-volt output.

Figure 3:
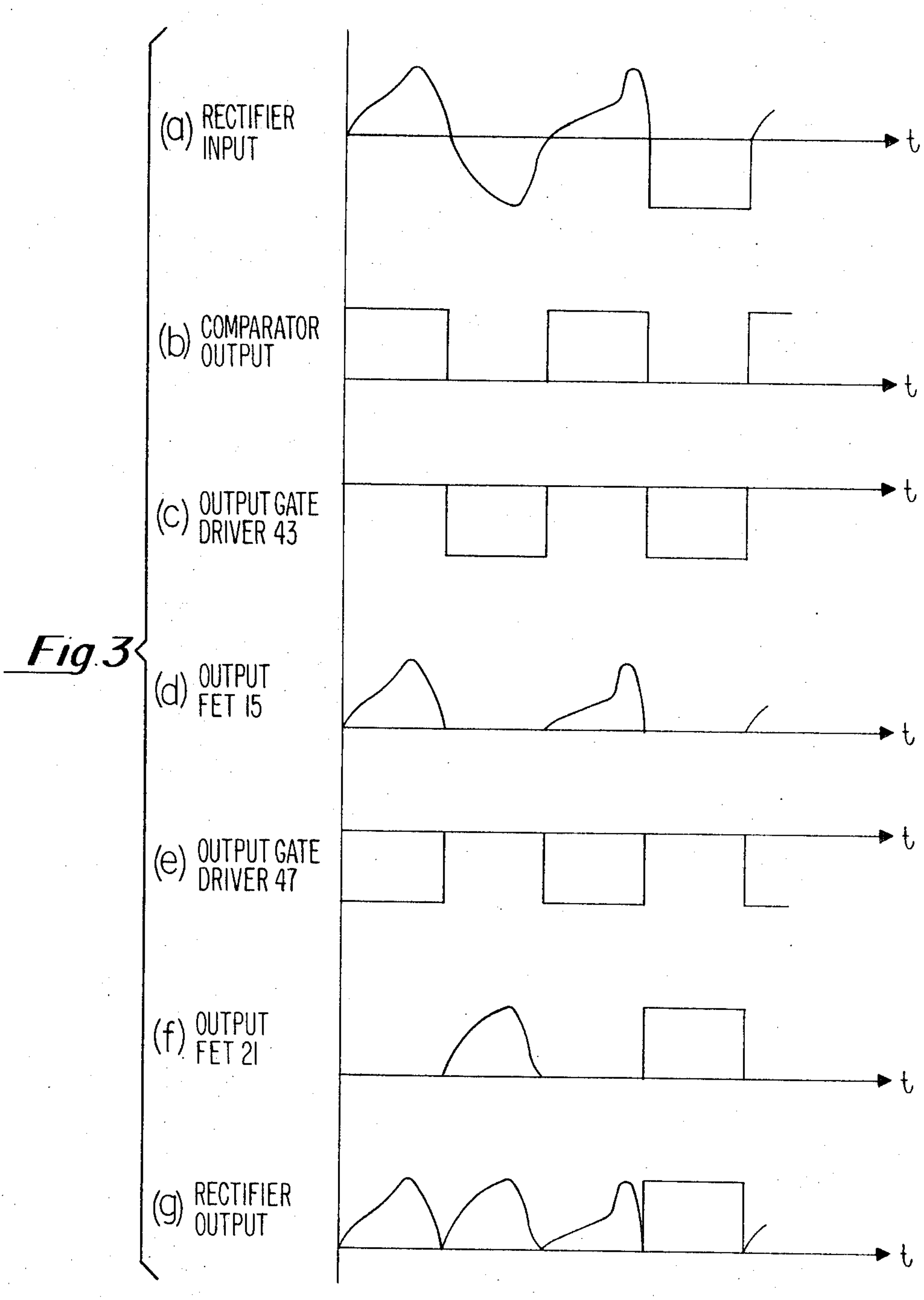
FIG. 3 is a graphical display of the waveforms associated with the circuit of FIG. 1.

In operation, when the positive portion of an arbitrary input signal, such as shown in FIG. 3*a*, is fed to input terminal 13, it is amplified by amplifier 33 and fed to comparator 37. Assuming in the illustrated embodiment, that rectification takes place about a 0-volt reference, that is, terminal 39 of comparator 37 is grounded, comparator 37 will generate a 10-volt output as shown in FIG. 3*b*. The output of comparator 37 is fed to gate driver 43, which shifts the 10-volt signal to 0 volts as shown in FIG. 3*c*. The 0-volt output from gate driver 43 is sufficient to enable FET 15 thereby completing a path between input terminal 13 and output terminal 17. FIG. 3*d* shows the output delivered through FET 15 during the time that the input signal is positive. Meanwhile, the output of comparator 37 is fed to logical inverter 45 and is therein converted to 0 volts. This voltage is fed to gate driver 47 and is shifted thereby to −10 volts as shown in FIG. 3*e*. This negative signal is sufficient to turn off FET 21, and therefore, as shown in FIG. 3*f*, prevents an output from being delivered through FET 21.

When the input signal goes negative with respect to the reference voltage, comparator 37 generates a 0-volt output as shown in FIG. 3*b*. This signal when fed to gate driver 43 is shifted to −10 volts as shown in FIG. 3*c* and is fed to the control terminal of FET 15. FET 15 is therefore turned off. The 0-volt output of comparator 37 is, also, fed to logical inverter 45 which converts this signal to 10 volts and feeds it to gate driver 47. As shown in FIG. 3*c*, gate driver 47 shifts this voltage to 0 volts which is then fed to the control terminal of FET 21. FET 21 is enabled, and the negative input signal is therefore conducted through inverter 19 and FET 21 to output 17.

As shown in FIGS. 3*d* and 3*f*, positive input signals are fed directly through FET 15 to the output terminal 17 and negative input signals are inverted and then delivered through FET 21 to the output terminal thus creating a full-wave rectified signal. FIG. 3*g* shows the resulting composite waveform at output 17.

Figure 4:
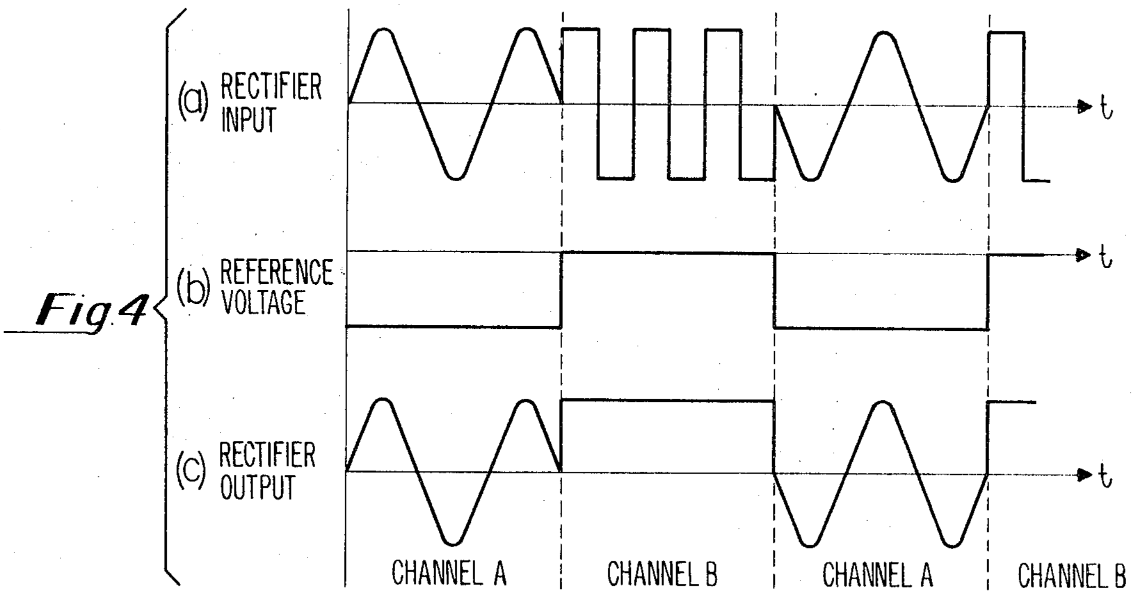
FIG. 4 is a graphical display of the waveforms associated with applicant's rectifier utilizing a square wave reference voltage.

The rectifier may be used to rectify only a time-divided portion of an input signal, or may function as a phase inverter. For example, if the input to terminal 13 is a multiplexed combination of two different signals derived from channel A and channel B of a receiver, as shown in FIG. 4*a*, and only the signal from channel B is to be rectified, a reference signal from source 41 having a square wave shape, as shown in FIG. 4*b*, may be used.

The amplitude of the reference voltage is preset more negative than the most negative portion of the channel A input signal during the time channel A is fed to the rectifier and is present at 0 volts during the time channel B is fed to the rectifier. Thus, during the time of transmission of channel A, since the reference input is always more negative than the rectifier input, FET 15 is continuously enabled and FET 21 is continuously turned off. Therefore, the channel A input will pass to output terminal 17 without rectification. However, when the channel B portion of the input signal is being fed to input 13, rectification is about a 0-volt reference, and therefore the signal is fullwave rectified. The composite output is shown in FIG. 4C. If the reference waveform 4*b* were phase inverted such that during transmission of channel A, the reference voltage would always be more positive than the channel A input signal, the channel A signal would be inverted. This results because FET 21 would be enabled, and FET 15 would be turned off.

Figure 5:
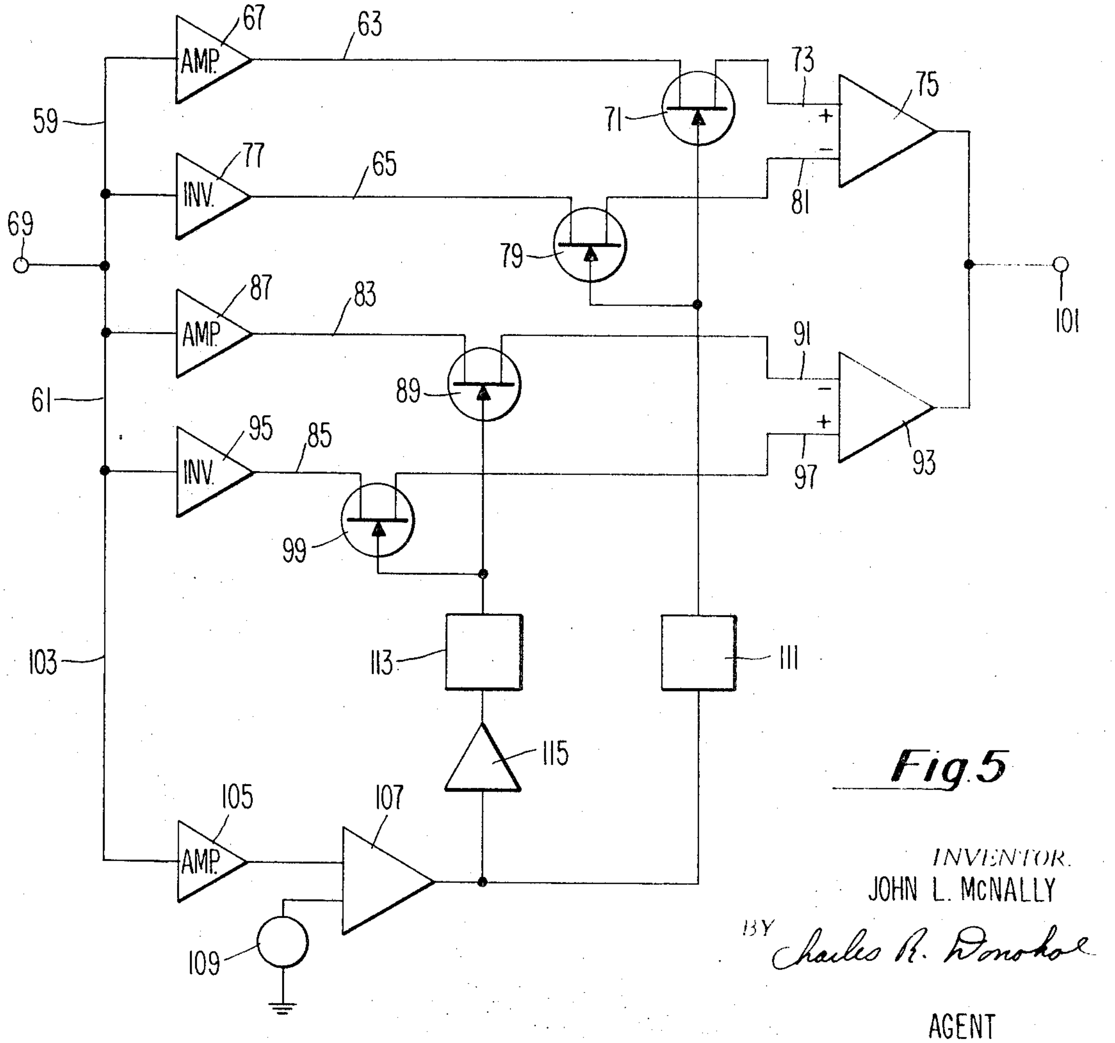
FIG. 5 is a block diagram of an alternate embodiment of applicant's rectifier.

A second embodiment of my invention is shown in FIG. 5 having essentially the same functional structure as that disclosed in the preferred embodiment except that each forward path 59 and 61 is bifurcated. Bifurcated path 59 is comprised of branches 63 and 65. Branch 63 includes an amplifier 67 connected to the rectifier input terminal 69 and a FET 71 connected between amplifier 67 and terminal 73 of a differential amplifier 75. FET 71 functions as a gate for passing signals from amplifier 67 to differential amplifier 75 when FET 71 is enabled. Branch 65 comprises an inverter 77 having the same gain factor as amplifier 67 and a FET 79 connected between the inverter 77 and terminal 81 of differential amplifier 75. The output of differential amplifier 75 is connected to the rectifier output terminal 101 and is in-phase with the signal at terminal 73 and 180° out-of-phase with the signal at terminal 81. The second bifurcated forward path 61 comprises branches 83 and 85. Branch 83 includes an amplifier 87 connected to rectifier input 69 and a FET 89 which is connected between the amplifier 87 and terminal 91 of differential amplifier 93. Branch 85 includes an inverter 95 having the same gain factor as amplifiers 67 and 87 and inverter 77 and is connected between rectifier input terminal 69 and terminal 97 of differential amplifier 93 through FET 99. The output of amplifier 93 is connected to the rectifier output 101 and is in-phase with the signal at terminal 97 and 180° out-of-phase with the signal at terminal 91.

Signals for enabling FET gates 71, 79, 89 and 99 are generated in control path 103. As previously described in the preferred embodiment, this path includes an amplifier 105, a comparator 107 having a reference source 109 for establishing a reference potential, two gate drivers 111 and 113 and a logical inverter 115. The output of gate driver 111 is fed to FET's 71 and 79, and the output of gate driver 113 is fed to FET's 89 and 99.

In operation, when the input to the rectifier is positive with respect to the reference potential from source 109, comparator 107 generates a 10-volt output which is fed to gate driver 111 and logical inverter 115. Gate driver 111 shifts the positive voltage to 0 volts and feeds this signal to the control terminal of FET's 71 and 79. These FET's are thereby enabled. The positive input signal will, therefore, pass through amplifier 67 and FET 71 to differential amplifier 75 and will, also, be phase inverted by inverter 77 and passed through FET 79 to terminal 81 of differential amplifier 75. Amplifier 75 subtracts the two signals. Therefore, any in-phase noise signals generated by switching transients in FET's 71 and 79 are cancelled, and the 180° out-of-phase signals are amplified and fed to the output terminal 101. Meanwhile the 10-volt output of comparator 107 when fed to logical inverter 115 is converted to 0 volts. This signal when fed to gate driver 113 is shifted to −10 volts and fed to the control terminals of FET's 89 and 99. These gates are therefore closed so that no signal may pass therethrough.

When the input to the rectifier is negative with respect to reference source 109, comparator 107 emits a 0-volt output. This signal is fed to gate driver 111 and is shifted therein to −10 volts which is sufficient to turn off FET's 71 and 79. The 0-volt output in the comparator is, also, fed to logical inverter 115 and is therein converted to 10 volts and fed to gate driver 113. This voltage is shifted by gate driver 113 to 0 volts and is fed to FET's 89 and 99. FET's 89 and 99 are thus enabled. The negative portion of the input signal is therefore delivered to terminal 91 of differential amplifier 93 through amplifier 87 and FET 89, and is also inverted and delivered to terminal 97 of amplifier 93 by inverter 95 and FET 99. In-phase noise voltages generated by FET's 89 and 99 are cancelled by differential amplifier 93 while the 180° out-of-phase signals are amplified and delivered to output 101 of the rectifier. The composite output signal at terminal 101 is a full-wave rectified version of the arbitrary input signal. This embodiment is particularly useful at low input signal levels where any switching transients generated by the FET's may induce prohibitive distortion.

I claim:

1. A full-wave rectifier comprising:

an input terminal for receiving an arbitrary signal, an output terminal, first gating means connected to said output terminal, second gating means connected to said output terminal means cooperating with said input terminal for translating said input signal to said first gating means and for inverting and translating said input signal to said second gating means, a source for generating a reference voltage, and means cooperating with said input terminal and said reference source for enabling said first gating means when said input signal is more positive than said reference voltage and for enabling said second gating means when said input signal is more negative than said reference voltage.

2. A full-wave rectifier as defined in claim 1 wherein said means cooperating with said input terminal for translating said input signal to said first gating means and for inverting and translating said input signal to said second gating means is a differential amplifier having an in-phase output connected to said first gating means and having an inverted output connected to said second gating means.

3. A full-wave rectifier as defined in claim 1 wherein said means cooperating with said input terminal for translating said input signal to said first gating means and for inverting and translating said input signal to said second gating means is an amplifier coupling said input terminal with said first gating means and an inverter coupling said input terminal with said second gating means.

4. A full-wave rectifier as defined in claim 1 wherein said means cooperating with said input terminal and said reference source for enabling one of said gating means when said input signal is more positive than said reference voltage and for enabling the other of said gating means when said input signal is more negative than said reference voltage comprises:

a comparator coupled to said input terminal and said reference source, said comparator generating a first voltage when said input signal is more positive than said reference voltage and generating a second voltage when said input voltage is more negative than said reference voltage, first adaption means for enabling one of said gating means in response to said first voltage, and second adaption means for enabling other of said gating means in response to said second voltage.

5. A full-wave rectifier as defined in claim 1 wherein said first and second gating means are solid-state discharge devices.

6. A full-wave rectifier as defined in claim 1 wherein said first and second gating means are field-effect transistors.

7. A full-wave rectifier as defined in claim 1 wherein said first and second gating means each includes means for eliminating switching transients.

8. A full-wave rectifier comprising:

an input terminal for receiving an arbitrary signal, an output terminal, a first differential amplifier having an output connected with said output terminal, a second differential amplifier having an output connected with said output terminal, a first pair of gating means each connected to an individual input of said first differential amplifier, a second pair of gating means each connected to an individual input of said second differential amplifier, first means cooperating with said input terminal for translating said input signal to one of said first pair of gating means and for inverting and translating said input signal to other of said first pair of gating means, second means cooperating with said input terminal for translating said input signal to one of said second pair of gating means and for inverting and translating said input signal to other of said second pair of gating means, a reference source for generating a reference voltage, means cooperating with said input terminal and said reference source for enabling said first pair of gating means when said input signal is more positive than said reference voltage and for enabling said second pair of gating means when said input is more negative than said reference voltage.

9. A method of full-wave rectifying an arbitrary input signal about a reference voltage comprising the steps of:

sensing the polarity of said arbitrary input signal, enabling a first pair of gates when said signal is positive with respect to said reference voltage, enabling a second pair of gates when said signal is negative with respect to said reference voltage, translating the positive portion of said arbitrary signal through said first pair of gates, translating the negative portion of said arbitrary signal through said second pair of gates, cancelling the in-phase portions of said signal translated through said first pair of gates, cancelling the in-phase portions of said signal translated through said second pair of gates, summing the 180° out-of-phase portion of said signal translated through said first pair of gates, summing the 180° out-of-phase portion of said signal translated through said second pair of gages, and feeding the summed signals to an output terminal.